United States Patent
Ma et al.

(10) Patent No.: US 9,762,622 B2
(45) Date of Patent: *Sep. 12, 2017

(54) FLOW CONTROL SCHEME FOR PARALLEL FLOWS

(71) Applicant: Juniper Networks, Inc., Sunnyvale, CA (US)

(72) Inventors: Qingming Ma, Sunnyvale, CA (US); Kannan Varadhan, San Jose, CA (US); Rohini Kasturi, Livermore, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 200 days.

This patent is subject to a terminal disclaimer.

(21) Appl. No.: 14/587,935

(22) Filed: Dec. 31, 2014

(65) Prior Publication Data

US 2015/0109931 A1    Apr. 23, 2015

Related U.S. Application Data

(63) Continuation of application No. 12/502,808, filed on Jul. 14, 2009, now Pat. No. 8,949,444.

(51) Int. Cl.
*G06F 15/16* (2006.01)
*H04L 29/06* (2006.01)
(Continued)

(52) U.S. Cl.
CPC ........ *H04L 65/105* (2013.01); *H04L 12/2858* (2013.01); *H04L 47/10* (2013.01);
(Continued)

(58) Field of Classification Search
CPC ... H04L 65/105; H04L 12/2858; H04L 47/10; H04L 47/22; H04L 47/27; H04L 47/283
See application file for complete search history.

(56) References Cited

U.S. PATENT DOCUMENTS 7,796,942 B2    9/2010  Duffy et al.
2004/0030765 A1*  2/2004  Zilbershtein ...... H04L 29/12481
                                                           709/223

(Continued)

OTHER PUBLICATIONS

Co-pending U.S. Appl. No. 12/502,808, entitled "Flow Control Scheme For Parallel Flows" by Qingming Ma et al., filed Jul. 14, 2009, 45 pages.

*Primary Examiner* — Ryan Jakovac
(74) *Attorney, Agent, or Firm* — Harrity & Harrity, LLP

(57) ABSTRACT

A method includes a proxy device receiving from a source device a request to establish a flow to a destination device; generating, based on the request, a meta-packet that indicates that the flow to the destination device is to be proxied; determining whether a pre-established flow connecting the proxy device to another proxy device that leads toward the destination device exists; sending the meta-packet on the pre-established flow, when it is determined that the pre-established flow exists; receiving by the other proxy device, the meta-packet, and establishing the flow to the destination device based on the meta-packet, where the proxy devices assign one or more of a source address, a source port, a destination address, or a destination port, associated with the source device and the destination device, to the pre-established flow.

20 Claims, 7 Drawing Sheets

(51) Int. Cl.
*H04L 12/801* (2013.01)
*H04L 12/28* (2006.01)
*H04L 12/815* (2013.01)
*H04L 12/807* (2013.01)
*H04L 12/841* (2013.01)

(52) U.S. Cl.
CPC .............. *H04L 47/22* (2013.01); *H04L 47/27* (2013.01); *H04L 47/283* (2013.01)

(56) References Cited

U.S. PATENT DOCUMENTS

| | | |
|---|---|---|
| 2006/0129697 A1 | 6/2006 | Vange et al. |
| 2006/0215652 A1* | 9/2006 | Strandridge ............ H04L 12/24 370/389 |
| 2007/0297414 A1* | 12/2007 | Gupta .................... H04L 47/10 370/395.4 |
| 2008/0151776 A1* | 6/2008 | Kure .................... H04L 1/0007 370/253 |
| 2008/0201486 A1 | 8/2008 | Hsu et al. |
| 2009/0109849 A1 | 4/2009 | Wood et al. |
| 2010/0325420 A1 | 12/2010 | Kanekar |

\* cited by examiner

FLOW CONTROL SCHEME FOR PARALLEL FLOWS

RELATED APPLICATION

This application is a continuation of U.S. patent application Ser. No. 12/502,808, filed Jul. 14, 2009, the disclosure of which is incorporated herein by reference.

BACKGROUND

During the operation of various types of network environments, such as, for example, wide area networks (WANs), thousands of traffic flows may be setup and torn down. Network devices may utilize substantial processing resources to provide setup, window control, and buffer management functionalities. Additionally, bandwidth allocation and congestion avoidance becomes problematic.

Various techniques have been implemented to address these issues. For example, a single Transport Control Protocol (TCP) connection (known as "tunnel mode") may be utilized. The advantages of "tunnel mode" include low processing overhead and high bandwidth efficiency. However, a disadvantage of "tunnel mode" is the loss of application visibility, since all application packets are transmitted through the same port number. In a different approach, different TCP connections between systems may be utilized for different end-to-end TCP flows. An advantage to this approach is that application visibility is maintained. However, the disadvantages to this approach are high overhead and less bandwidth, processing and memory efficiency.

SUMMARY

According to one implementation, a method may include receiving, by a proxy device, from a source device, a request to establish a flow to a destination device; generating, by the proxy device, based on the request, a meta data unit that indicates that the flow to the destination device is to be proxied; determining, by the proxy device, whether a pre-established flow connecting the proxy device to another proxy device exists; sending, by the proxy device, the meta data unit on the pre-established flow that connects the proxy device to the other proxy device, when it is determined that the pre-established flow exist; receiving, by the other proxy device, the meta data unit; and establishing, by the other proxy device, the flow to the destination device based on the meta data unit.

According to another implementation, a network device may establish and maintain pre-established flows to other network devices, the pre-established flows leading towards destination devices, and the pre-established flows for use by a source device requesting a flow to one of the destination devices; receive a request, originating from the source device, to establish a flow to the one of the destination devices; generate a meta-packet that indicates the flow to the one of the destination devices is to be proxied; determine, based on the request, whether one of the pre-established flows to one of the other network devices corresponds to the flow leading toward the one of the destination devices requested by the source device; and utilize the one of the pre-established flows to the one of the other network devices when it is determined that the one of the pre-established flows corresponds to the flow to the one of the destination devices requested by the source device.

According to yet implementation, a computer-readable medium may have stored thereon instructions, executable by at least one processor. The computer-readable medium may include one or more instructions for selecting network devices to establish and maintain pre-established flows; one or more instructions for establishing and maintaining pre-established flows to the selected network devices for use when requests, to destination devices, originating from source devices are received; one or more instructions for receiving a request from one of the source devices to establish a flow to one of the destination devices; one or more instructions for generating a meta-packet based on the received request, where the meta-packet indicates that the flow to the one of the destination devices is to be proxied; one or more instructions for determining, based on the request, whether one of the pre-established flows to one of the selected network devices corresponds to an intermediary flow leading towards the one of the destination devices; and one or more instructions for providing to the one of the source devices, the flow to the one of the destination devices, when it is determined that the one of the pre-established flows and the one of the selected network devices provide the intermediary flow leading towards the one of the destination devices.

According to still another implementation, a network device may include means for selecting network devices to establish and maintain pre-established flows; means for establishing and maintaining pre-established flows to the selected network devices for use by source devices; means for receiving a request from one of the source devices to establish a flow to a destination device; means for generating a meta-packet based on the received request, where the meta-packet indicates that an intermediary flow leading towards the destination device is to be proxied; means for determining, based on the request, whether one of the pre-established flows and one of the selected network devices correspond to the intermediary flow leading towards the destination device; means for sending the generated meta-packet to the one of the selected network devices, when it is determined that the one of the pre-established flows and the one of the selected network devices correspond to the intermediary flow leading towards the destination device; means for assigning one or more of a source address associated with the one of the source devices, a source port associated with the one of the source devices, a destination address associated with the destination device, or a destination port associated with the destination device, to the one of the pre-established flows; and means for providing to the one of the source devices, the flow to the destination device, via the one of the selected network devices, based on the meta-packet.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

Figure 1:
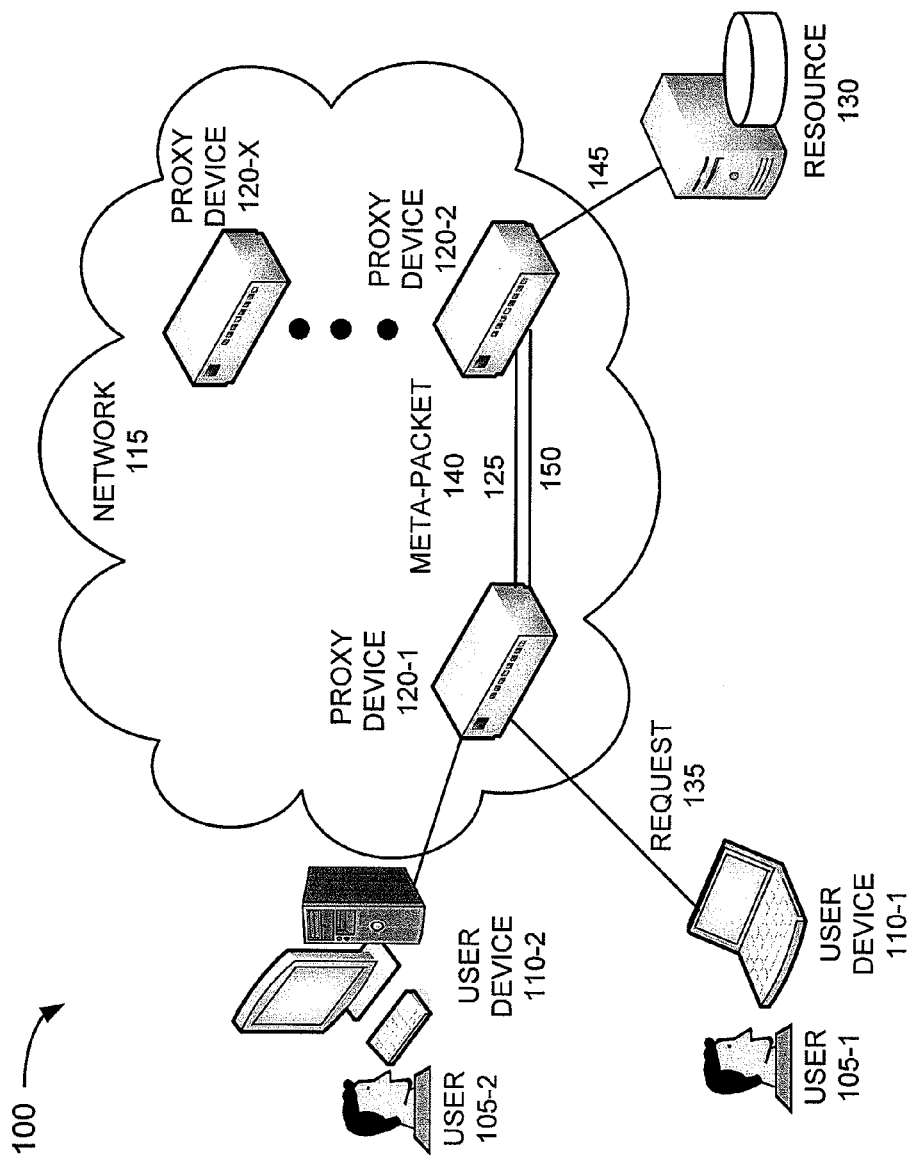
FIG. 1 is a diagram illustrating an overview of exemplary embodiments described herein.

The following detailed description refers to the accompanying drawings. The same reference numbers in different drawings may identify the same or similar elements. Also, the following description does not limit the invention. Instead, the scope of the invention is defined by the appended claims and equivalents.

The term "meta-packet" or "meta data unit," as used herein, is intended to be broadly interpreted to include, for example, a segment, a packet, a non-packet, or some other type of data packaging or data arrangement.

Embodiments described herein provide for methods, devices, and systems that establish and manage traffic flows such that overhead, processing, and memory utilization is minimized, bandwidth efficiency is improved, and application visibility is maintained. As will be described, pre-established flows between proxy devices may avoid individual setup and tear down of multiple flows. For example, in one implementation, a pre-established flow may correspond to a TCP flow. A single window control may be utilized to manage the multiple pre-established flows.

Additionally, application visibility may be maintained based on a meta-packet that may include information related to utilizing a pre-established flow. For example, the meta-packet may include a source port number, as well as other types of information (e.g., source address, destination port, destination address, etc.). The meta-packet may be transmitted from one proxy device to another proxy device over a pre-established flow. The receiving proxy device may utilize the meta-packet information to establish a flow from a source device to a destination device. In one implementation, proxy devices may maintain pre-established flows with other proxy devices by transmitting a time-to-live packet or some other form of transmission to keep the pre-established flows alive or active. In instances when a proxy device does not have a pre-established flow with another proxy device that connects to a destination device requested by a source device, the proxy device may establish a new flow with the other proxy device.

The proxy devices may measure the available bandwidth associated with established flows based on, for example, a monitoring of round trip times (RTTs) associated with acknowledgements (ACKs) and/or some other form of packet-pair based probes. Based on this measurement, the bandwidth associated with the established flows may be dynamically regulated. Typically, in network environments, a slow start process in which the network is probed to determine the available capacity is utilized. However, the embodiments described herein may eliminate the slow start process by determining the sending rate for each flow based on the measured available bandwidth and the number of active flows.

Congestion avoidance may be based on a single retransmission timer. The single retransmission timer may be utilized to determine loss packets for all of the multiple flows. When a loss is detected by the retransmission timer, the aggregate sending rate for all of the multiple flows may be reduced. For example, the available bandwidth may be dynamically adjusted and the sending rate for each flow may be fractionally reduced.

Since application visibility is maintained, different applications may be managed according to different traffic characteristics, such as, bandwidth, queuing, or quality of service (QOS).

Embodiments described herein will be described in relation to Transport Control Protocol (TCP) flows. Under the TCP standard, a three-way handshake is typically required to provide reliable end-to-end communication. The overhead associated with TCP connection setups may be substantial, particularly when many TCP flows are short-lived. Further, as mentioned above, resource utilization may become less efficient. It will be appreciated, however, that the embodiments described herein have applicability to protocol standards, other than TCP, as well as network architectures other than those examples described herein.

FIG. 1 is a diagram illustrating an overview of exemplary embodiments described herein. By way of example, an exemplary environment 100 may include users 105-1 and 105-2 (referred to generally as users 105), user devices 110-1 and 110-2 (referred to generally as user device 110), a network 115 that may include proxy devices 120-1 through 120-X (referred to generally as proxy device 120), and a resource 130. A pre-established flow 125 between proxy devices 120-1 and 120-2 may exist and/or is active. Pre-established flow 125 may correspond to one or multiple TCP flows. In other instances, a new flow 150 may need to be established when, for example, pre-established flow 125 may not exist and/or is inactive.

The number of devices and configuration in environment 100 is exemplary and provided for simplicity. In practice, environment 100 may include additional, fewer, and/or different devices, and/or differently arranged devices than those illustrated in FIG. 1. Additionally, or alternatively, the connections between devices are provided for simplicity.

Also, some functions described as being performed by a particular device may be performed by a different device or a combination of devices. For example, in other embodiments, the functions associated with proxy device 120-1 and/or proxy device 120-2 may be incorporated into user device 110 and/or resource 130. Additionally, in other embodiments, the functions associated with proxy device 120-1 and/or proxy device 120-2 may be distributed between more than two proxy devices 120 (i.e., proxy device 120-1 and proxy device 120-2) illustrated and described herein. Environment 100 may include wired and/or wireless connections among the devices.

User device 110 may include a device having the capability to communicate with other devices, systems, networks, and/or the like. For example, user device 110 may correspond to a computer (e.g., a laptop, a desktop, a handheld computer), a personal digital assistant (PDA), a wireless telephone, an Internet-browsing device, or another type of communication device.

Network 115 may include one or multiple networks of any type. For example, network 115 may include a private network, a public network, a local area network (LAN), a metropolitan area network (MAN), a wide area network (WAN), the Internet, an intranet, a telephone network (e.g., the Public Switched Telephone Network (PSTN) or a cellular network), a satellite network, a computer network, and/or a combination of networks.

Proxy device 120 may include a network device having the capability to communicate with other devices, systems, networks, and/or the like. For example, proxy device 120 may correspond to a network computer, a router, a gateway, an access point, or some other type of communication device that may process and/or forward network traffic. As will be described, proxy device 120 may manage TCP flows as well as other communication-related issues (e.g., congestion, bandwidth, etc.).

Resource 130 may include a device that provides a service, data, and/or some other type of asset. For example, resource 130 may correspond to a Web server, a mail server, a data repository, or the like.

In an exemplary operation, user 105, via user device 110, may establish a TCP connection with resource 130. For example, assume resource 130 may correspond to a web server. In such an instance, from the perspective of network 115, three TCP flows may need to be established. The first TCP flow is between user device 110 and proxy device 120-1. The second TCP flow is between proxy device 120-1 and proxy device 120-2 (i.e., pre-established flow 125 or new flow 150). The third TCP flow is between proxy device 120-2 and resource 130.

When proxy device 120-1 receives a request 135 to establish a connection with resource 130, proxy device 120-1 may generate a meta-packet 140. Meta-packet 140 may include a port number of user device 110 (i.e., a source port number) as well as other information (e.g., source address, destination port number, destination address) to establish a TCP flow to resource 130. Meta-packet 140 may also include a tag to indicate that the TCP flow is being proxied.

In one implementation, as previously described, proxy device 120-1 may maintain a pool of pre-established flows with other proxy devices 120. Proxy device 120-1 may select the appropriate proxy device 120 to establish a flow from user device 110-1 to resource 130. When proxy device 120-1 selects the appropriate proxy device 120 (e.g., proxy device 120-2), proxy device 120-1 may refer to the pool of pre-established flows to determine whether a pre-established flow exists between proxy device 120-1, and in this example, proxy device 120-2. When a pre-established flow exists, proxy device 120-1 may utilize the pre-established flow to forward meta-packet 140. For example, proxy device 120-1 may forward meta-packet 140 over pre-established flow 125 to proxy device 120-2. Alternatively, when a pre-established flow does not exist, proxy device 120-1 may set-up a new flow 150 (e.g., a TCP flow) with proxy device 120-2. In either instance, proxy device 120-1 may forward meta-packet 140 to proxy device 120-2 so that a flow may be established between user device 105 and resource 130.

In one embodiment, referred to herein as transparent mode, for each TCP connection between user device 110 and proxy device 120-1, a new TCP connection (i.e., pre-established flow 125 or new flow 150 between proxy device 120-1 and proxy device 120-2) may include the same source address (e.g., source Internet Protocol (IP) address), the same destination address (e.g., destination IP address), the same source port and/or the same destination port, as the end-to-end connection between user device 110 and resource 130.

In another embodiment, referred to herein as opaque mode, for each TCP connection between user device 110 and proxy device 120-1, a new TCP connection (i.e., pre-established flow 125 or new flow 150 between proxy device 120-1 and proxy device 120-2) may include the source address (e.g., source IP address) of proxy device 120-1 and the destination address (e.g., destination IP address) of proxy device 120-2. If the source port numbers (i.e., source port numbers of user devices 110-1 and 110-2) are available (e.g. not the same), then proxy device 120-1 may utilize those port numbers. However, if the source port numbers are the same (i.e., source port numbers of user devices 110-1 and 110-2 are the same), proxy device 120-1 may increase the source port number associated with one of user devices 110, by some increment (e.g., by one), until an unused source port number is found. Proxy device 120-1 may perform operations analogous to those described with respect to destination port numbers.

When proxy device 120-2 receives meta-packet 140, proxy device 120-2 may inspect meta-packet 140 and establish a flow 145 with the destination device (e.g., resource 130) based on meta-packet 140.

Additionally, as previously described, proxies 120-1 and 120-1 may manage the available bandwidth associated with pre-established flow 125, provide for single window control, provide for a single retransmission timer for all flows associated with pre-established 125, and/or provide for different bandwidth sharing policies.

Since the embodiments have been broadly described, variations exist. Accordingly, a detailed description of the embodiments is provided below.

Exemplary Device Architecture

Figure 2:
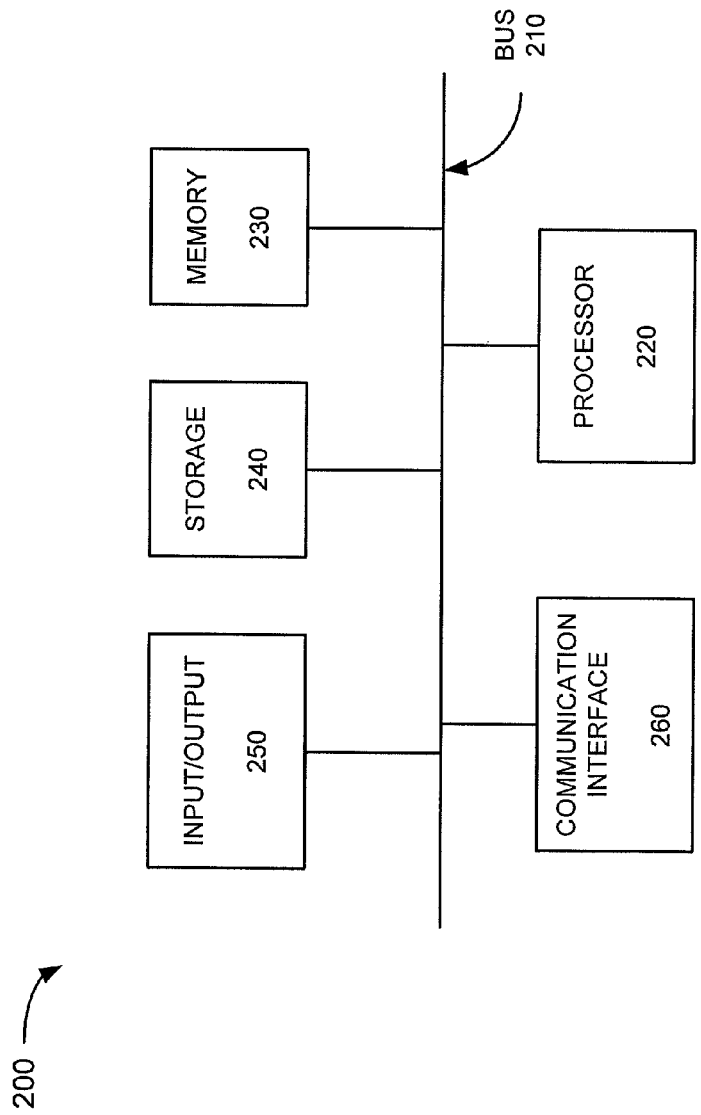
FIG. 2 is a diagram illustrating exemplary components of a device that may correspond to one or more of the devices depicted in FIG. 1.

FIG. 2 is a diagram illustrating exemplary components of a device 200 that may correspond to one or more of the devices in FIG. 1. For example, device 200 may correspond to user device 110, proxy device 120, and/or resource 130. As illustrated, device 200 may include, for example, a bus 210, a processor 220, a memory 230, storage 240, an input/output 250, and a communication interface 260.

Bus 210 may permit communication among the other components of security device 125. For example, bus 210 may include a system bus, an address bus, a data bus, and/or a control bus. Bus 210 may also include bus drivers, bus arbiters, bus interfaces, and/or clocks.

Processor 220 may interpret and/or execute instructions and/or data. For example, processor 220 may include a processor, a microprocessor, a data processor, a co-processor, a network processor, an application specific integrated circuit (ASIC), a controller, a programmable logic device, a field programmable gate array (FPGA), or some other processing logic that may interpret and/or execute instructions.

Memory 230 may store data and/or instructions. For example, memory 230 may include a random access memory (RAM), a dynamic random access memory (DRAM), a static random access memory (SRAM), a synchronous dynamic random access memory (SDRAM), a read only memory (ROM), a programmable read only memory (PROM), an erasable programmable read only memory (EPROM), an electrically erasable programmable read only memory (EEPROM), another type of dynamic or static memory, a cache, and/or a flash memory.

Storage 240 may store data, instructions, and/or applications. For example, storage 240 may include a hard disk (e.g., a magnetic disk, an optical disk, a magneto-optic disk, etc.), a compact disc (CD), a digital versatile disc (DVD), a floppy disk, a cartridge, a magnetic tape, a flash drive, or another type of computer-readable medium, along with a corresponding drive. The term "computer-readable medium" is intended to be broadly interpreted to include, for example, memory, storage, or the like. The computer-readable medium may be implemented in a single device or in multiple devices. The storing space of the computer-readable medium may be centralized or distributed. A computer-readable medium may correspond to, for example, a physical memory device or a logical memory device. A logical memory device may include memory space within a single physical memory device or spread across multiple physical memory devices.

Input/output 250 may permit input to and output from device 200. For example, input/output 250 may include a keyboard, a keypad, a mouse, a button, a switch, a microphone, voice recognition logic, a pen, a display, a port, or the like to permit input. Additionally, or alternatively, input/output 250 may include a display, a speaker, one or more light emitting diodes (LEDs), a port, or the like, to permit output.

Communication interface 260 may enable device 200 to communicate with another device, a network, another system, and/or the like. For example, communication interface 260 may include a wireless interface and/or a wired interface, such as, an Ethernet interface, an optical interface, etc. Communication interface 260 may include a transceiver.

With respect to proxy device 120, device 200 may perform operations and/or processes related to managing TCP flows. According to an exemplary implementation, device 200 may perform these operations and/or processes in response to processor 220 executing sequences of instructions contained in a computer-readable medium. For example, software instructions may be read into memory 230 from another computer-readable medium, such as storage 240, or from another device via communication interface 260. The software instructions contained in memory 230 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

Although, FIG. 2 illustrates exemplary components of device 200, in other implementations, device 200 may include additional, fewer, different, or differently arranged components than those illustrated in FIG. 2 and described herein. Additionally, or alternatively, one or more operations described as being performed by a particular component of device 200 may be performed by one or more other components, in addition to or instead of the particular component.

Figure 3A:
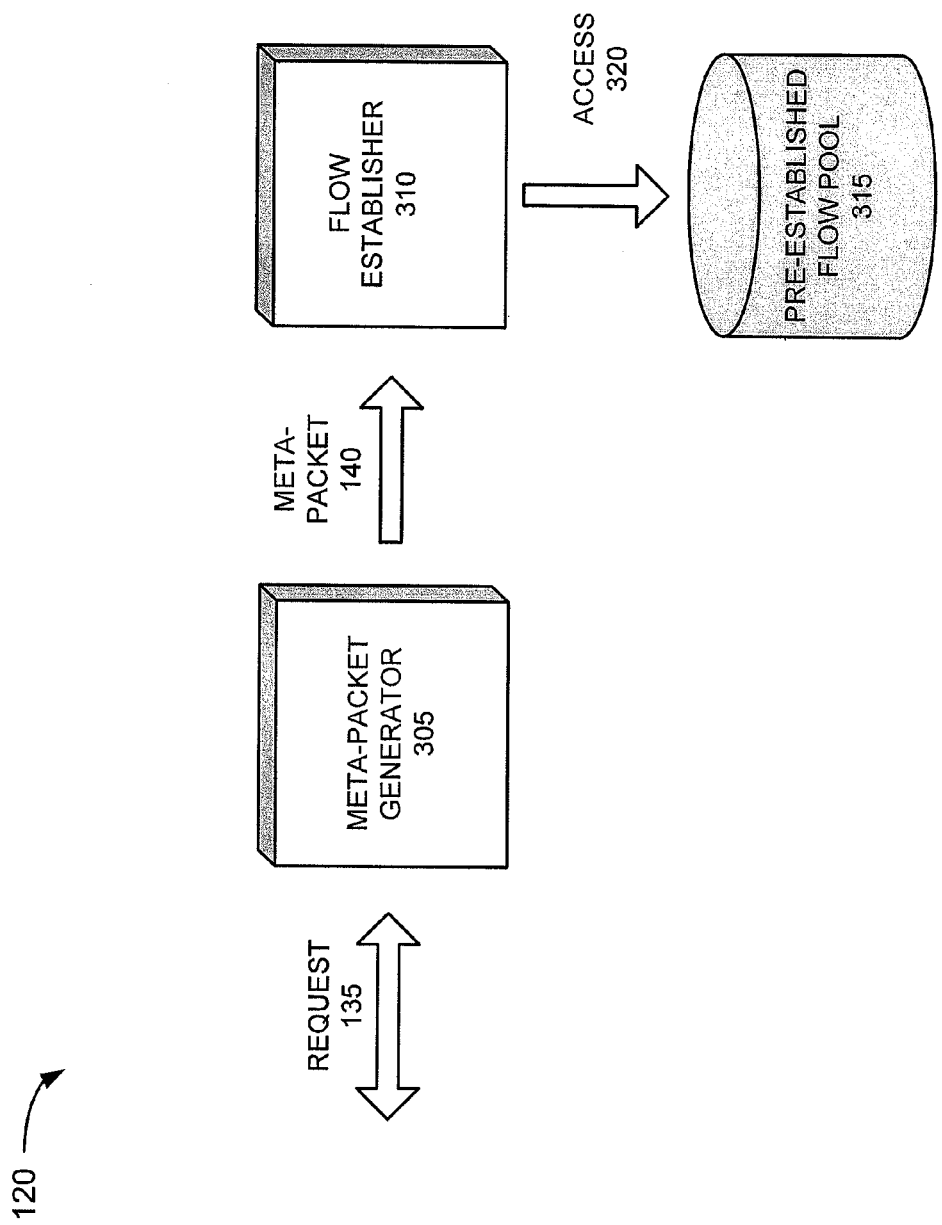
FIGS. 3A and 3B are diagrams illustrating exemplary functional components of the proxy device depicted in FIGS. 1 and 2.
Figure 3B:
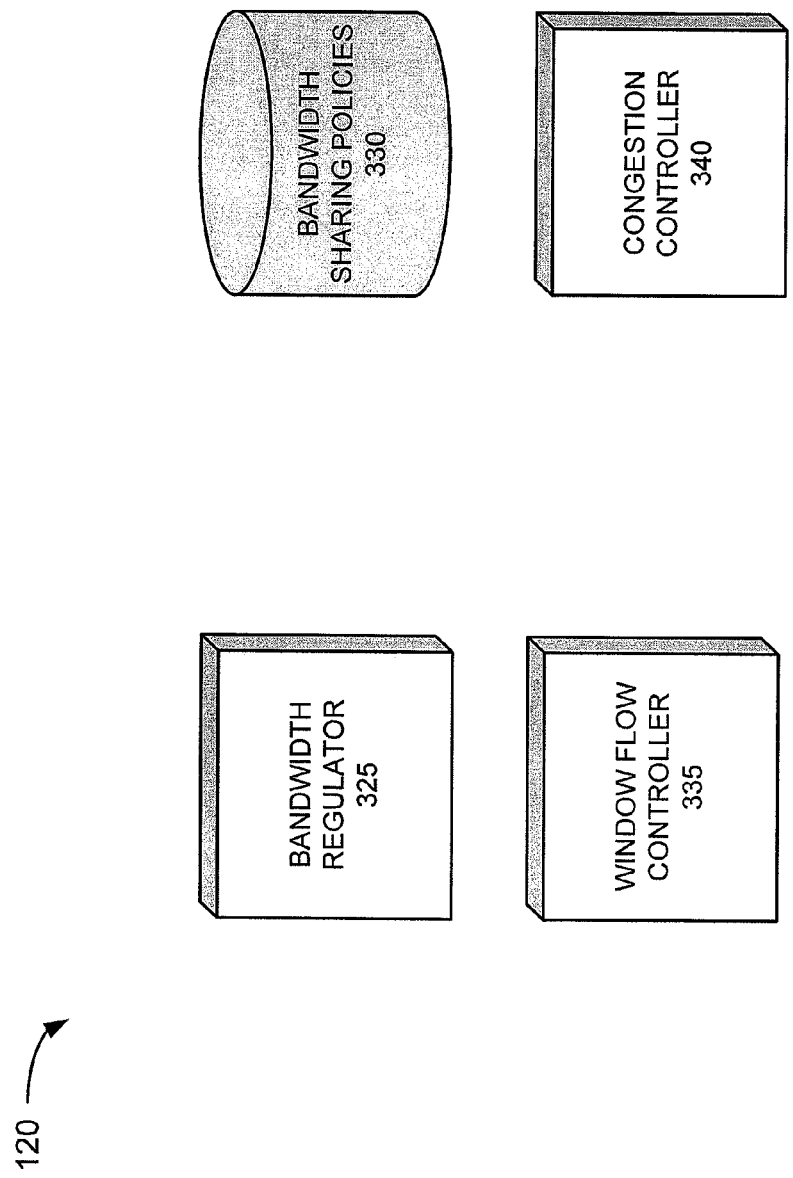

FIGS. 3A and 3B are diagrams illustrating exemplary functional components of proxy device 120. FIG. 3A illustrates exemplary functional components related to establishing a TCP flow. FIG. 3B illustrates exemplary functional components related to maintaining TCP flows. Proxy device 120-1 and proxy device 120-2 may include, respectively, one or more of the functional components, described herein.

As illustrated in FIG. 3A, proxy device 120 may include a meta-packet generator 305, a destination flow establisher 310, and a pre-established flow pool 315. The functional components illustrated in FIG. 3A may be implemented by hardware (e.g., processor 220, memory 230, storage 240, and/or other components described in FIG. 2) or a combination of hardware and software. While a particular number and arrangement of functional components are illustrated in FIG. 3A, in other implementations, proxy device 120 may include fewer, additional, and/or different functional components, and/or differently arranged functional components than those illustrated in FIG. 3A. Further, it will be appreciated that these functional components may be implemented in other devices (e.g., user device 110, resource 140) in environment 100.

Meta-packet generator 305 may generate meta-packet 140. For example, as previously described, when proxy device 120-1 receives request 135 to establish a TCP flow to a particular destination (e.g., resource 130), meta-packet generator 305 may generate meta-packet 140. Meta-packet 140 may include information for establishing the TCP flow to the destination. For example, meta-packet 140 may include a source port number, a source address, a destination port number, a destination address, and a tag that indicates that this TCP flow is being proxied. Meta-packet 140 may include other types of TCP flow information, such as, for example, QOS, type of service (TOS), etc.

Flow establisher 310 may select a TCP flow to the particular proxy device 120. For example, as previously described, when proxy device 120-1 receives meta-packet 140, flow establisher 310 may determine whether a pre-established TCP flow exists to a proxy device 120 leading towards a destination (e.g., a destination address) indicated in meta-packet 140. In one implementation, flow establisher 310 may access 320 pre-established flow pool 315 to determine whether a pre-established TCP flow exists with respect to another proxy device 120 leading towards the destination. For example, flow establisher 310 may consult a forwarding table or some other type of routing-based arrangement, to identify or select the appropriate proxy device 120 in which to forward meta-packet 140 and/or establish a flow from source device to destination device (e.g., user device 110 and resource 130). When flow establisher 310 identifies or selects the appropriate proxy device 120, flow establisher 310 may determine whether a pre-established flow exists between proxy devices 120 (i.e., proxy device 120 of flow establisher 310 and the identified proxy device 120). In one implementation, flow establisher 310 may consult pre-established flow pool 315. As described herein, pre-established flow pool 315 may correspond to one or multiple active TCP flows that exist between proxy device 120 and other proxy devices 120. Flow establisher 310 may determine whether a pre-established flow exists and/or is active between proxy device 120 and the selected other proxy device 120. When flow establisher 310 determines that a pre-established flow exists and/or is active, flow establisher 310 may send meta-packet 140 to the selected proxy device 120 utilizing the pre-established flow. Alternatively, when flow establisher 310 determines that a pre-established flow does not exist and/or is inactive, pre-established flow pool 315 may establish a new TCP flow (e.g., new flow 150). Flow establisher 310 may send meta-packet 140 to the selected proxy device 120 utilizing the new TCP flow.

Pre-established flow pool 315 may establish and maintain TCP flows with other proxy devices 120. For example, pre-established flow pool 315 may transmit a TTL packet or some other form of transmission to maintain an established TCP flow as active. Proxy devices 120 with which pre-established flow pool 315 establishes and maintains the TCP flows, may be network configured. For example, a network administrator may have pre-established flow pool 315 establish and maintain TCP flows with proxy devices 120 that are actively utilized by users or meet some other type of network-configured threshold. In one embodiment, pre-established flow pool 315 may dynamically change the selection of proxy devices 120 to which pre-established flows are established and maintained based on network activity. In another embodiment, the selection of proxy devices 120 to which pre-established flows are established and maintained may be relatively static. For example, the selection of proxy devices 120 may be based on a measure of popularity (e.g., by the number of requests to the proxy device 120).

Pre-established flow pool 315 may include a repository of pre-established TCP flows. Pre-established flow pool 315 may include information associated with the pre-established TCP flows, such as, for example, proxy device 120 identifiers (e.g., network address), QOS, TOS, etc. In this way, proxy device 120 may determine whether a suitable pre-established flow exists and/or is active that corresponds to the selected other proxy device 120.

FIG. 3B illustrates exemplary functional components relating to the management of TCP flows. As illustrated in FIG. 3B, proxy device 120 may include a bandwidth regulator 325, bandwidth sharing policies 330, a window flow controller 335, and a congestion controller 340. The functional components illustrated in FIG. 3B may be implemented by hardware (e.g., processor 220, memory 230, storage 240, and/or other components illustrated in FIG. 2) or a combination of hardware and software. While a particular number and arrangement of functional components are illustrated in FIG. 3B, in other implementations, proxy device 120 may include fewer, additional, and/or different functional components, or differently arranged functional components than those illustrated in FIG. 3B. Further, it will be appreciated that these functional components may be implemented in other devices (e.g., user device 110, resource 140) in environment 100.

Bandwidth regulator 325 may dynamically regulate the available bandwidth between proxy devices 120. In one implementation, bandwidth regulator 325 may monitor the RTTs associated with ACKs occurring in the TCP flows of pre-established flow 125. In another implementation, bandwidth regulator 325 may monitor some other form of packet-pair probing occurring in the TCP flows of pre-established flow 125. In one implementation, bandwidth regulator 325 may select a particular bandwidth, based on the RTTs associated with ACKs and/or some other form of packet probing, by utilizing a TCP Vegas-like algorithm or some other type of similar algorithm. Bandwidth regulator 325 may determine a sending rate for each TCP flow based on the measured available bandwidth and the number of active TCP flows. Additionally, bandwidth regulator 325 may allocate more or less bandwidth, allot different sending rates, or other traffic characteristics (e.g., QOS, TOS, queuing) based on bandwidth sharing policies 330, as described herein. Bandwidth regulator 325 may implement fair-sharing algorithms (e.g., for equal distribution of bandwidth to TCP flows) or weighted-fair queuing algorithm (e.g., to support different bandwidth policies for different applications).

Bandwidth sharing policies 330 may correspond to a repository of bandwidth sharing policies. Bandwidth sharing policies 330 may include policies that interrelate bandwidth with other traffic characteristics, such as, for example, QOS, TOS, and/or type of application (TOA). Bandwidth sharing policies 330 may include policies that interrelate bandwidth with, for example, network addresses, port numbers, or other forms of criteria. In one implementation, bandwidth sharing policies 330 may include policies in which all TCP flows equally share the available bandwidth equally. In another implementation, bandwidth sharing policies 330 may include policies in which all TCP flows unequally share the available bandwidth. For example, bandwidth sharing policies 330 may include policies that correspond to a traffic hierarchy to allow different bandwidth sharing policies to be applied to different portions of the traffic hierarchy.

Window flow controller 335 may provide a single window control for all TCP flows. Window flow controller 335 may implement a single sending window for all TCP flows and correspondingly a single receiving window for all TCP flows. Window flow controller 335 may separate data buffers for different TCP flows. In one implementation, window flow controller 335 may assign a global sequence number to each TCP segment. The receiving window may determine the sequence of the TCP segments for each TCP flow based on a global sequence number.

Congestion controller 340 may provide a single retransmission timer for all of TCP flows. The retransmission timer may be utilized to determine loss of TCP segments for all of the multiple flows. When a loss of TCP segments is detected by the retransmission timer, the aggregate sending rate for all of the multiple TCP flows may be reduced. For example, the available bandwidth may be dynamically adjusted and the sending rate for each TCP flow may be fractionally reduced to respond to the network congestion.

Exemplary Process

As described herein, proxy devices 120 may establish and manage TCP flows such that overhead, processing, and memory utilization is minimized, bandwidth efficiency is improved, and application visibility is maintained. Proxy devices 120 may utilize pre-established TCP flows to reduce connection setup overhead. Proxy devices 120 may utilize a single flow congestion control to reduce the number of state variables associated with individual TCP flows. Proxy devices 120 may dynamically measure the available bandwidth to regulate existing TCP flows and to establish new TCP flows. For TCP flows destined to the same proxy device 120, only one TCP state variable (e.g., slow start threshold (ssthresh)) may be utilized for all TCP flows, which may be based on the measured available bandwidth. Proxy devices 120 may provide granularity (e.g., varying levels of QOS, TOS, bandwidth availability, sending rate, etc.) for TCP flows. Additionally, proxy devices 120 may maintain application visibility.

Figure 4:
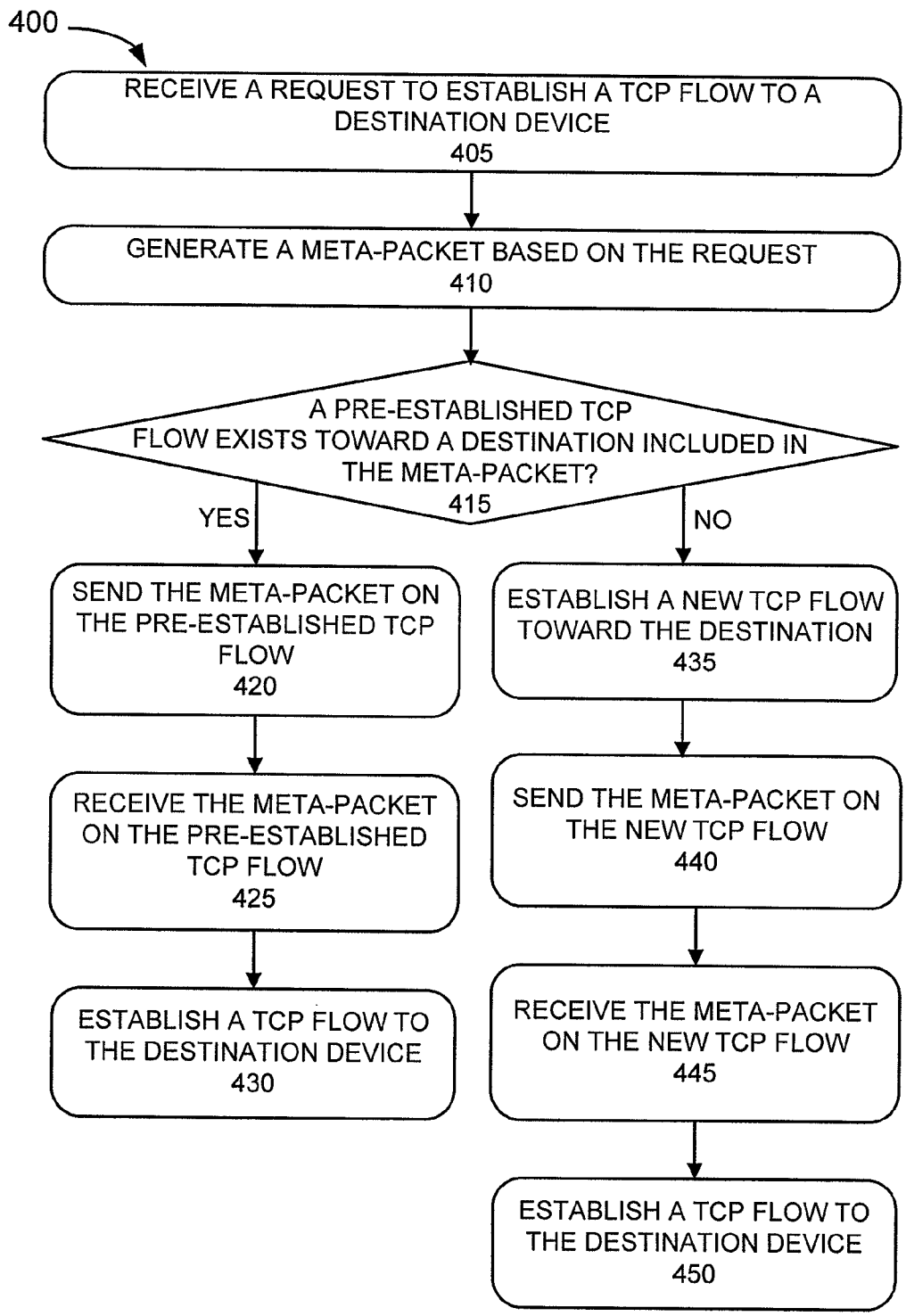
FIG. 4 is a flow diagram illustrating an exemplary process for establishing a TCP flow.

FIG. 4 is a flow diagram illustrating an exemplary process 400 for establishing TCP flows. Process 400 may be performed by hardware (e.g., processor 220 and/or some other type of logic, memory 230, etc.), or a combination of hardware and software in proxy devices 120. In another implementation, one or more operations associated with process 400 may be performed by another device in conjunction with proxy devices 120. Process 400 will be described in conjunction with other figures.

Process 400 may begin with receiving a request to establish a TCP flow to a destination (block 405). For example, user device 110 may transmit a request to establish a TCP flow with a destination (e.g., resource 130). The request may be received by proxy device 120-1.

A meta-packet based on the request may be generated (block 410). Meta-packet generator 305 may generate meta-packet 140. For example, as previously described, when proxy device 120-1 receives request 135 to establish a TCP flow to a particular destination (e.g., resource 130), meta-packet generator 305 may generate meta-packet 140. Meta-packet 140 may include information for establishing the TCP flow to the destination. For example, meta-packet 140 may include a source port number, a source address, a destination port number, a destination address, and a tag that indicates that this TCP flow is being proxied. Meta-packet 140 may include other types of TCP flow information, such as, for example, QOS, type of service (TOS), etc.

It may be determined whether a pre-established flow TCP flow exists toward a destination included in the generated meta-packet (block 415). For example, as previously described, when proxy device 120-1 receives meta-packet 140, flow establisher 310 may determine whether a pre-established TCP flow exists and/or is active to a proxy device 120 leading towards a destination (e.g., a destination address) indicated in meta-packet 140. In one implementation, flow establisher 310 may access 320 pre-established flow pool 315 to determine whether a pre-established TCP flow exists and/or is active with respect to another proxy device 120 leading towards the destination. For example, flow establisher 310 may consult a forwarding table or some other type of routing-based arrangement, to identify or select the appropriate proxy device 120 in which to forward meta-packet 140 and/or establish a flow from source device to destination device (e.g., user device 110 and resource 130).

When flow establisher 310 identifies or selects the appropriate proxy device 120, flow establisher 310 may determine whether a pre-established flow exists between proxy devices 120 (i.e., proxy device 120 of flow establisher 310 and the identified proxy device 120). In one implementation, flow establisher 310 may consult pre-established flow pool 315. Flow establisher 310 may determine whether a pre-established flow exists between proxy device 120 and the selected other proxy device 120.

When it is determined that a pre-established flow TCP flow exists toward a destination included in the generated meta-packet (block 415—YES), the generated meta-packet may be sent on the pre-established flow (block 420). For example, as previously described, when flow establisher 310 determines that the pre-established flow exists, flow establisher 310 may send meta-packet 140 to the selected proxy device 120 utilizing the pre-established flow. For example, proxy device 120-1 may transmit meta-packet 140 on pre-established flow 125 to another proxy device 120 (e.g., proxy device 120-2).

In one embodiment, referred to herein as transparent mode, the TCP connection (i.e., pre-established flow 125 between proxy device 120-1 and proxy device 120-2) may include the same source address (e.g., source Internet Protocol (IP) address), the same destination address (e.g., destination IP address), the same source port and/or the same destination port as the end-to-end connection between user device 110 and resource 130.

In another embodiment, referred to herein as opaque mode, the TCP connection (i.e., pre-established flow 125 between proxy device 120-1 and proxy device 120-2) may include the source address (e.g., source IP address) of proxy device 120-1 and the destination address (e.g., destination IP address) of proxy device 120-2. If the source port numbers (i.e., source port numbers of user devices 110-1 and 110-2) are available (e.g. not the same), then proxy device 120-1 may utilize those port numbers. However, if the source port numbers are the same (i.e., source port numbers of user devices 110-1 and 110-2 are the same), proxy device 120-1 may increase the source port number associated with one of user devices 110, by some increment (e.g., by one), until an unused source port number is found. Proxy device 120-1 may perform operations analogous to those described with respect to destination port numbers.

The meta-packet may be received on the pre-established TCP flow (block 425). For example, as previously described, proxy device 120-2 may receive meta-packet 140 on pre-established flow 125 from proxy device 120-1.

A TCP flow may be established to the destination (block 430). For example, as previously described, proxy device 120-2 may establish a TCP flow with the destination device based on meta-packet 140. For example, proxy device 120-2 may identify the destination address and/or destination port number indicated in meta-packet 140 to establish a TCP connection 145 with the destination device (e.g., resource 130).

When it is determined that a pre-established flow TCP flow does not exist toward a destination included in the generated meta-packet (block 415—NO), a new TCP flow may be established toward the destination (block 435). For example, as previously described, proxy device 120 (e.g., pre-established flow pool 315) may establish a new TCP flow 150 when a pre-established TCP does not exist and/or is inactive with respect to the selected other proxy device 120 (e.g., proxy device 120-2).

The meta-packet may sent on the new TCP flow (block 440). For example, as previously described, flow establisher 310 may send meta-packet 140 to the selected proxy device 120 utilizing new TCP flow 150. For example, proxy device 120-1 may transmit meta-packet 140 on new TCP flow 150 to another proxy device 120 (e.g., proxy device 120-2).

In one embodiment, referred to herein as transparent mode, the new TCP connection (i.e., new TCP flow 150 between proxy device 120-1 and proxy device 120-2) may include the same source address (e.g., source Internet Protocol (IP) address), the same destination address (e.g., destination IP address), the same source port and/or the same destination port as the end-to-end connection between user device 110 and resource 130.

In another embodiment, referred to herein as opaque mode, the new TCP connection (i.e., new TCP flow 150 between proxy device 120-1 and proxy device 120-2) may include the source address (e.g., source IP address) of proxy device 120-1 and the destination address (e.g., destination IP address) of proxy device 120-2. If the source port numbers (i.e., source port numbers of user devices 110-1 and 110-2) are available (e.g. not the same), then proxy device 120-1 may utilize those port numbers. However, if the source port numbers are the same (i.e., source port numbers of user devices 110-1 and 110-2 are the same), proxy device 120-1 may increase the source port number associated with one of user devices 110, by some increment (e.g., by one), until an unused source port number is found. Proxy device 120-1 may perform operations analogous to those described with respect to destination port numbers.

The meta-packet may be received on the new TCP flow (block 445). For example, as previously described, proxy device 120-2 may receive meta-packet 140 on new TCP flow 150 from proxy device 120-1.

A TCP flow may be established to the destination device (block 450). For example, as previously described, proxy device 120-2 may establish a TCP flow with the destination device based on meta-packet 140. For example, proxy device 120-2 may identify the destination address and/or destination port number indicated in meta-packet 140 to establish TCP connection 145 with the destination device (e.g., resource 130).

Although FIG. 4 illustrates an exemplary process 400, in other implementations, fewer, additional, or different operations may be performed.

Exemplary Process

As previously described, proxy device 120 may perform additional processes and operations for managing TCP flows, as described herein, with respect to bandwidth regulator 325, bandwidth sharing policies 330, window flow controller 335, and congestion controller 340.

Figure 5:
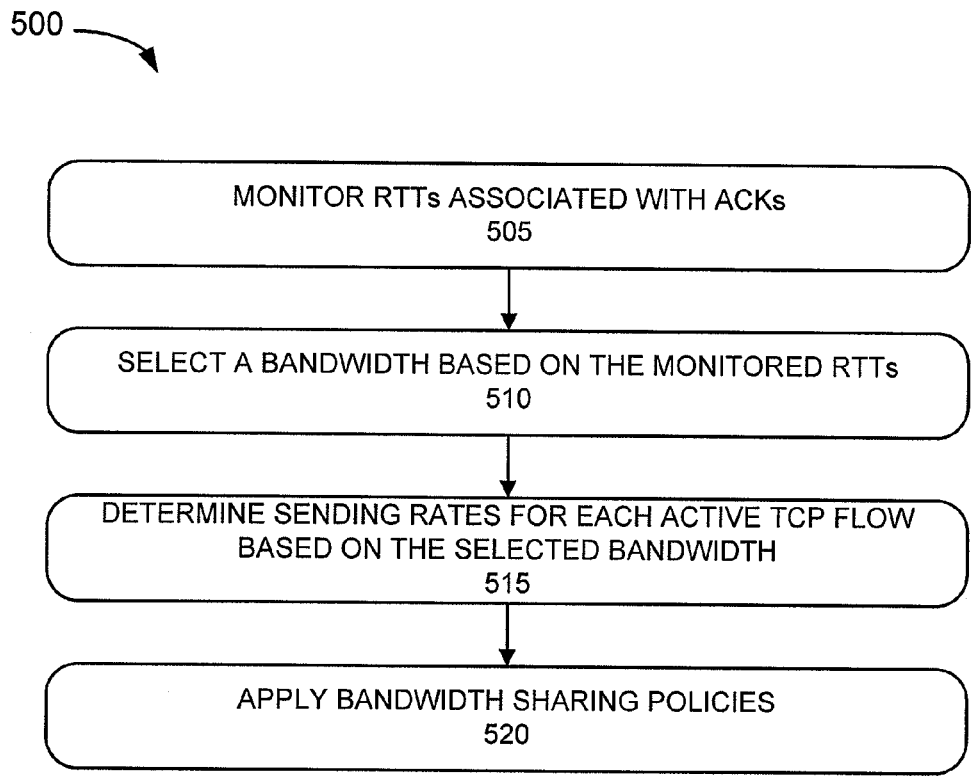
FIG. 5 is a flow diagram illustrating an exemplary process for regulating bandwidth.

FIG. 5 is a flow diagram illustrating an exemplary process 500 for regulating bandwidth. Process 500 may be performed by hardware (e.g., processor 220 and/or some other type of logic, memory 230, etc.), or a combination of hardware and software in proxy devices 120. In another implementation, one or more operations associated with process 500 may be performed by another device in conjunction with proxy devices 120. Process 500 will be described in conjunction with other figures.

RTTs associated with ACKs may be monitored (block 505). For example, proxy device 120 (e.g., bandwidth regulator 325) may monitor the RTTs associated with ACKs occurring in the TCP flows of pre-established flow 125. As previously described, in other implementations, packet-pair probing and/or other types of transmissions may be monitored.

A bandwidth may be selected based on the monitored RTTs (block 510). For example, bandwidth regulator 325 may select a bandwidth based on the RTTs associated with the ACKs. For example, bandwidth regulator 325 may select a bandwidth based on a TCP Vegas-like algorithm or some other type of similar algorithm. As previously described, in other implementations, bandwidth regulator 325 may select a bandwidth based on packet-pair probing and/or other types of monitored transmissions.

Sending rates for each active TCP flow may be determined based on the determined bandwidth (block 515). Bandwidth regulator 325 may determine a sending rate for each TCP flow based on the determined bandwidth. For example, bandwidth regulator 325 may select a sending rate for each TCP flow based on the number of active flows and the available bandwidth.

Bandwidth sharing policies may be applied (block 520). Bandwidth regulator 325 may consult bandwidth sharing policies 330 and allot different QOS, TOS, queuing, and/or other types of traffic characteristics to the active TCP flows. Bandwidth regulator 325 may adapt sending rates and available bandwidth to the active TCP flows based on bandwidth sharing policies 330. As previously described, bandwidth sharing policies 330 may include policies that interrelate bandwidth with, for example, network addresses, port numbers, or other forms of criteria. In one embodiment, bandwidth sharing policies 330 may include policies in which all TCP flows equally share the available bandwidth equally. In another embodiment, bandwidth sharing policies 330 may include policies in which all TCP flows unequally share the available bandwidth. For example, bandwidth sharing policies 330 may include policies that correspond to a traffic hierarchy to allow different bandwidth sharing policies to be applied to different portions of the traffic hierarchy.

Although FIG. 5 illustrates an exemplary process 500, in other implementations, fewer, additional, or different operations may be performed.

Exemplary Process

Figure 6:
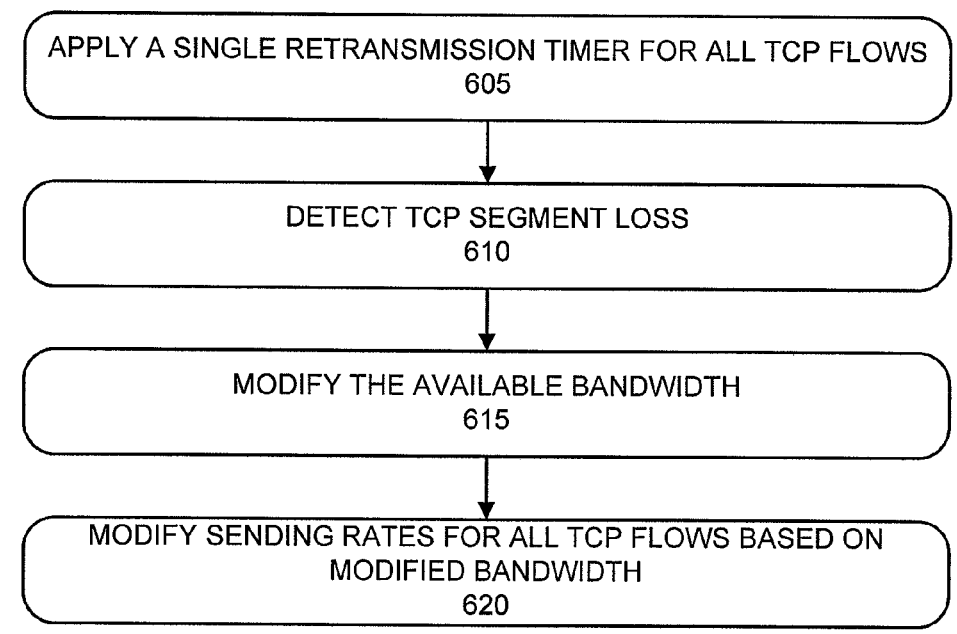
FIG. 6 is a flow diagram illustrating an exemplary process for congestion control.

FIG. 6 is a diagram illustrating an exemplary process for congestion control. Process 600 may be performed by hardware (e.g., processor 220 and/or some other type of logic, memory 230, etc.), or a combination of hardware and software in proxy devices 120. In another implementation, one or more operations associated with process 600 may be performed by another device in conjunction with proxy devices 120. Process 600 will be described in conjunction with other figures.

A single retransmission timer may be applied for all TCP flows (block 605). For example, proxy device 120 (e.g., congestion controller 340) may provide for a single retransmission timer for all TCP flows associated with pre-established flow 125. The retransmission timer may be utilized to determine loss of TCP segments for each active TCP flow.

TCP segment loss may be detected (block 610). Congestion controller 340 may detect TCP segment loss based on the retransmission timer. For example, congestion controller 340 may detect TCP segment loss associated with one or more of the active TCP flows.

The available bandwidth may be modified (block 615). Congestion controller 340 may modify the available bandwidth based on the loss of TCP segments. For example, congestion controller 340 may consider the number of TCP segments loss, the number of TCP flows experiencing TCP segment loss, the setting of the retransmission timer, etc.

Sending rates for all TCP flows may be modified based on the modified bandwidth (block 620). Congestion controller 340 may modify the sending rates for each of the TCP flows based on the modified bandwidth. For example, congestion controller 340 may fractionally reduce the sending rates for each TCP flow in accordance with the modified bandwidth.

Although FIG. 6 illustrates an exemplary process 600, in other implementations, fewer, additional, or different operations may be performed.

Conclusion

The foregoing description of implementations provides an illustration, but is not intended to be exhaustive or to limit the implementations to the precise form disclosed. Modifications and variations are possible in light of the above teachings or may be acquired from practice of the teachings. For example, although embodiments have been described with respect to the TCP, other types of transport layers (e.g., user datagram protocol (UDP), etc.) or end-to-end communication protocols may be utilized.

In addition, while series of blocks has been described with regard to the process illustrated in FIGS. 4-6, the order of the blocks may be modified in other implementations. Further, non-dependent blocks may be performed in parallel.

Also, certain aspects have been described as being implemented as "logic" or a "component" that performs one or more functions. This logic or component may include hardware, such as a processor, microprocessor, an ASIC, or a FPGA, or a combination of hardware and software, such as a processor/microprocessor executing instructions stored in a computer-readable medium.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

The term "may" is used throughout this application and is intended to be interpreted, for example, as "having the potential to," "configured to," or "being able," and not in a mandatory sense (e.g., as "must"). The terms "a," "an," and "the" are intended to be interpreted to include one or more items. For example, processor 220 may include one or more processors. Where only one item is intended, the term "one" or similar language (e.g., "single") is used. Further, the phrase "based on" is intended to be interpreted as "based, at least in part, on," unless explicitly stated otherwise. The term "and/or" is intended to be interpreted to include any and all combinations of one or more of the associated list items.

Even though particular combination of features are recited in the claims and/or disclosed in the specification, these combinations are not intended to limit the disclosure of the invention. In fact, many of these features may be combined in ways not specifically recited in the claims and/or disclosed in the specification.

No element, block, or instruction used in the present application should be construed as critical or essential to the implementations described herein unless explicitly described as such.

What is claimed is:

1. A method comprising:
  establishing, by a first proxy device, a flow to a second proxy device;
  determining, by the first proxy device, that a first source port number, of a first source device connected to the first proxy device, is a same value as a second source port number of a second source device connected to the first proxy device;
  increasing, by the first proxy device, the first source port number to create a new first source port number after determining that the first source port number is the same value as the second source port number;
  monitoring, by the first proxy device, one or more round trip times associated with one or more acknowledgements occurring in the flow;
  selecting, by the first proxy device, a bandwidth based on the one or more round trip times;
  determining, by the first proxy device, a sending rate for the flow based on the bandwidth;
  applying, by the first proxy device, one or more policies based on the sending rate and the new first source port number; and
  sending, by the first proxy device, a data unit to the second proxy device via the flow after increasing the first source port number and based on applying the one or more policies.

2. The method of claim 1, where increasing the first source port number comprises:
  increasing the first source port number by a particular increment until reaching the new first source port number, and
  determining that the new first source port number is unused.

3. The method of claim 1, where establishing the flow to the second proxy device comprises:
  determining that a pre-established flow is not active between the first proxy device and the second proxy device, and
  establishing the flow to the second proxy device based on determining that the pre-established flow is not active between the first proxy device and the second proxy device.

4. The method of claim 1, where establishing the flow to the second proxy device comprises:
  receiving, from the first source device, a request to establish a flow to a destination device, and
  establishing the flow to the second proxy device based on the request.

5. The method of claim 4, further comprising:
  selecting the second proxy device based on the destination device.

6. The method of claim 1, further comprising:
  assigning the new first source port number to the flow after increasing the first source port number.

7. The method of claim 1, where the second proxy device establishes a flow to a destination device based on the data unit.

8. The method of claim 1, further comprising:
  receiving a request to establish a flow to a destination device; and
  generating the data unit based on the request.

9. A system comprising:
  a first proxy device, implemented at least partially in hardware, to:
    establish a flow to a second proxy device;
    determine that a first port number, of a first device connected to the first proxy device, is a same value as a second port number of a second device connected to the first proxy device;
    change the first port number to create a new first port number after determining that the first port number is the same value as the second port number;
    monitor one or more round trip times associated with one or more acknowledgements occurring in the flow;
    select a bandwidth based on the one or more round trip times;
    determine a sending rate for the flow based on the bandwidth;
    apply one or more policies based on the sending rate and the new first port number; and
    send a data unit to the second proxy device via the flow after creating the new first port number and based on applying the one or more policies.

10. The system of claim 9, where the first proxy device is further to:
  receive a request to establish the flow; and
  generate the data unit based on the request.

11. The system of claim 9, where the first proxy device is further to:
  identify a destination device; and
  select the second proxy device based on the destination device.

12. The system of claim 9, where, when establishing the flow to the second proxy device, the first proxy device is to:
  determine that a pre-established flow is not active between the first proxy device and the second proxy device, and
  establish the flow to the second proxy device based on determining that the pre-established flow is not active between the first proxy device and the second proxy device.

13. The system of claim 9, where the flow is a Transport Control Protocol (TCP) flow.

14. The system of claim 9, where, when changing the first port number, the first proxy device is to:
  increase the first port number by a particular increment until reaching the new first port number, and
  determine that the new first port number is unused.

15. The system of claim 9, where, when establishing the flow to the second proxy device, the first proxy device is to:
  assign the new first port number to the flow after increasing the first port number.

16. The system of claim 9, where the data unit includes information identifying a destination device.

17. The system of claim 9,
where the system further comprises the second proxy device, and
where the second proxy device is to:
  establish a flow to a destination device based on the data unit.

18. A non-transitory computer-readable medium storing instructions, the instructions comprising:
one or more instructions that, when executed by at least one processor of a first proxy device, cause the at least one processor to:
  determine that a first port number, of a first device connected to the first proxy device, is a same value as a second port number of a second device connected to the first proxy device;
  change the first port number to create a new first port number after determining that the first port number is the same value as the second port number;
  monitor one or more round trip times associated with one or more acknowledgements occurring in a flow to a second proxy device;
  select a bandwidth based on the one or more round trip times;
  determine a sending rate for the flow based on the bandwidth;
  apply one or more policies based on the sending rate and the new first port number; and
  send a data unit to the second proxy device after creating the new first port number and based on applying the one or more policies.

19. The non-transitory computer-readable medium of claim 18,
where the instructions further comprise:
  one or more instructions that, when executed by the at least one processor, cause the at least one processor to:
    establish the flow to the second proxy device, and
  where the instructions to send the data unit comprise:
    one or more instructions that, when executed by the at least one processor, cause the at least one processor to:
      send the data unit via the flow after creating the new first port number.

20. The non-transitory computer-readable medium of claim 18, where the instructions further comprise:
  one or more instructions that, when executed by the at least one processor, cause the at least one processor to:
    assign the new first port number to the flow after changing the first port number.

* * * * *